United States Patent [19]

Oberg et al.

[11] 4,191,500
[45] Mar. 4, 1980

[54] DENSE-PHASE FEEDER METHOD

[75] Inventors: Carl L. Oberg; George A. Hood, both of Canoga Park, Calif.

[73] Assignee: Rockwell International Corporation, El Segundo, Calif.

[21] Appl. No.: 903,434

[22] Filed: May 8, 1978

Related U.S. Application Data

[63] Continuation-in-part of Ser. No. 819,307, Jul. 27, 1977, abandoned.

[51] Int. Cl.² .................. B01J 1/00; B65G 53/04; B65G 53/40
[52] U.S. Cl. .................................. 406/146; 406/12; 422/110; 422/111; 422/112; 422/232
[58] Field of Search ............... 422/105, 110, 111, 112, 422/232, 233, 242, 219, 310; 302/26, 35, 53, 66, 28; 208/175; 406/12, 146

[56] References Cited

U.S. PATENT DOCUMENTS

| | | | |
|---|---|---|---|
| 1,073,963 | 9/1913 | Cottle | 239/565 |
| 1,313,605 | 8/1919 | Reynolds | 239/424.5 |
| 1,871,853 | 8/1932 | Kennedy | 302/28 |
| 2,413,407 | 12/1946 | Dreyfus | 208/130 |
| 2,813,138 | 11/1957 | MacQueen | 422/62 X |
| 3,347,599 | 10/1967 | Topper et al. | 302/66 |
| 3,554,607 | 1/1971 | Herman et al. | 302/28 |
| 3,567,288 | 3/1971 | Wood | 302/28 |
| 3,963,598 | 6/1976 | Manowitz et al. | 208/8 |

*Primary Examiner*—Joseph Scovronek
*Attorney, Agent, or Firm*—L. Lee Humphries; Henry Kolin; Clark E. DeLarvin

[57] ABSTRACT

A method for the dense-phase flow of particulate solids utilizes a pressurized feeder and flow splitter which transports and equally divides particulate material at essentially the bulk density with only the gas contained in interstices of the solid particles being used to transport the particles. The feeder comprises a vessel which is pressurized, a gas source for pressurization and an outlet line with a full opening valve located immediately adjacent to the feeder. The loaded vessel containing particulate matter is pressurized, followed by opening the valve adjacent the feeder, the valve and relatively empty downstream line when flow is initiated being the key to successful operation of the dense-phase feeder. The downstream flow divider evenly distributes the dense-phase material to, for example, a multiplicity of feed passages in a multi-passage injector.

7 Claims, 4 Drawing Figures

DENSE-PHASE FEEDER METHOD

CROSS-REFERENCE TO RELATED APPLICATIONS

This application is a continuation-in-part of application Ser. No. 819,307, filed July 27, 1977 and since abandoned.

BACKGROUND OF THE INVENTION

1. Field of the Invention

This invention relates to the coal processing field.

More particularly, this invention relates to the coal fluidization field wherein dense-phase coal is equally divided between multiple injection passages in an injector from a single coal feed line and fed to a coal reaction chamber for hydrogenation of the coal particles by hot hydrogen injected through the injector.

2. Description of the Prior Art

A series of issued patents to C. H. O. Berg, U.S. Pat. Nos. 2,684,868, 2,684,870 and 2,684,872 describe a means to transport solid particles in a gaseous medium.

Since all of the foregoing patents are closely related, a brief description of U.S. Pat. No. 2,684,870 will suffice to describe the closest prior art to Applicants' invention. This patent describes an improved selective adsorption process in which the granular adsorbent is conveyed upwardly through a lift line and downwardly through an adsorption column in substantially the same condition of solids bulk density. It has been found that a conduit may be maintained with a vertically rising mass of solid granular adsorbent in which the bulk density of the solids is substantially the same as the bulk density of the solids when at rest as static bulk density.

This is accomplished by forcing a flow of lift gas upwardly through the interstices of the granules to establish frictional forces (indicated by the pressure differential) which are sufficient to overcome the gravitational forces on the adsorbent granules as well as the frictional forces of the conduit walls on the moving bed of adsorbent and cause the mass to move upward. The actual velocity of the lift gas necessary to accomplish this result is dependent upon the size and density of the granules, and the viscosity of the lift gas which is directly determined by the pressure and temperature. The velocities are generally sufficient to cause fluidization of the adsorbent granules if the adsorbent granules were free to fluidize or become suspended in the lift gas.

All of the Berg patents relate primarily to vertical movement of solids in a continuous flow loop. The Berg patents, additionally, describe a vertical column that has a narrow opening at the bottom of the column and a wide opening at the top, the column describing somewhat of a cone shape. The reason for this is to prevent clogging of the column as the granules are moved upwardly through the pipe. Thus, it can be seen that in the Berg references, clogging of the column could occur.

The present disclosure relates to a dense-phase feeding of particulate solids through horizontal and/or vertical feed pipes. Also, the present invention utilizes a ball valve immediately adjacent to the feeder exit to allow flow of solid particles to be established. The Berg references heretofore described initiate flow by simply providing a pressure differential in the vertical feeder line. In the present invention, if a valve positioned at the exit of the feeder vessel is not used and flow is initiated by simply pressurizing the feeder vessel, the feed line will consistently plug. In addition, the Berg references employ a "thrust plate" or choke at the exit of the diverging vertical tube. The present invention does not require a choke to control flow of dense-phase material through the feeder lines.

SUMMARY OF THE INVENTION

A method for the dense-phase flow of particulate solids utilizes a dense-phase particulate solids feeder and flow splitter apparatus, the combination consisting of a feeder vessel having a first sealable inlet end and a second outlet end, with a valve positioned adjacent to the outlet of the feeder vessel, and an inlet end of a downstream feeder line. A pressure inlet line is connected to the feeder vessel. The feeder vessel is pressurized through said pressure inlet line, after the vessel is filled with the particulate solids with the valve turned to a closed position and the vessel is subsequently sealed, to a pressure above the pressure in the feeder line downstream of the valve. A flow splitter housing having first and second ends is connected to a second end of the feeder line, the housing forming a manifold thereby. The second end of the housing has a multiplicity of downstream diverging outlet feeder lines extending therefrom, each of the feeder lines being in communication with a series of separate diverging channels formed in the second end of the housing that intersect the center of the manifold in a cone, the apex of the cone facing the outlet of the feeder line connected to the housing, the apex serving to divert particulate solids passing through said flow splitter housing equally between inlet ends of the separate diverging channels toward the multiplicity of outlet feeder lines when the valve adjacent the feeder vessel is opened.

A coal feeder system is disclosed wherein a coal feeder bin is pressurized by introducing gas to the top of the feeder vessel containing pulverized coal, the vessel being adapted to flow the pressurized coal out of the bottom of the vessel. A ball valve or other full opening valve is positioned at the bottom of the coal feeder bin which allows the feeder vessel to be pressurized prior to initiation of flow. In order to establish and maintain an adequate flow, adequate pressure drop must be created between the feeder bin and the feeder line downstream. Without the valve of an adequate pressure drop between the feeder bin and the feeder line, the feed line would frequently plug. An even flow of dense-phase coal particles is essential when directed into a coal splitter to assure an even distribution between a multiplicity of separate coal feed lines diverging from the coal splitter apparatus.

Pulverized coal with a mass-medium size, for example, of 50 to 200 microns is placed in the coal feeding vessel. It has been determined that the coal with these average particle sizes will flow readily as long as the coal is sufficiently dispersed in a carrier gas to prevent intimate particle-to-particle contact. Successful flow tests were made utilizing this system to obtain coal flow rates of 0.1 to about 10 lbs/sec with a pressure drop in the feeder tube of 5 to about 100 psi over line lengths from a few feet to about 80 feet. The gas flow rate necessary to transport the finely divided coal was found to be very small. Flow densities of up to about 1000 lbs. coal per lb. carrier gas have been achieved with the present invention. The results indicate that on the average only the gas in the interstices of the coal at its compressed bulk density is carried with the coal.

The feed system has been successfully used with pulverized coal and several transport gases. Tests were run with a feeder coal particulate carrier gas of nitrogen, helium, and carbon dioxide as well as hydrogen.

Where it is desirable to transport particulate materials such as coal particles from a feeder at maximum solid density and with a minimum amount of gas for transport of the solid, the foregoing system is ideal. The feed system is currently being utilized to feed pulverized coal into a single injector element liquefaction or gasification reactor, and has been additionally successfully demonstrated in combination with a coal splitter assembly whereby an even distribution of coal was fed to six individual injector elements. The feeder system comprises a vessel which is pressurized, a gas source for pressurization, and an outlet line with a relatively full opening ball valve located immediately adjacent to the feeder. A line downstream of the valve feeds into, for example, a coal splitter assembly heretofore mentioned. The feeder is operated by loading the vessel with particulate material such as pulverized coal and pressurizing to a level determined by the pressure drop in the outlet line and the downstream pressure, and opening the ball valve to allow the material to flow out towards the splitter assembly. The valve, close-coupled to the feeder, and a relatively empty downstream line when flow is initiated are essential to the successful operation of the foregoing system. If the line between the feeder and the valve is too long, the particulate material will pack in the line and prevent flow of the material. However, if the full-opening valve is close-coupled to the feeder vessel and the downstream line is initially free of solids, the pulverized coal material will flow readily from the feeder at its bulk density towards the coal splitter apparatus. A consistent flow of dense-phase coal is essential for an even distribution of coal particles in each of the separated coal distribution lines downstream of the splitter apparatus. For example, if the coal splitter divides the incoming coal particles from the single feed line from the feeder vessel into six equal distribution feed lines, each of these feed lines terminates at an injector face. Each of the six feed lines may have separate impinging streams of hot hydrogen downstream of the injector face, the hydrogenation process taking place in a downstream reaction chamber. The reaction of hot hydrogen and dense-phase coal particles is controlled to a specific residence time by quenching of the reaction products as they exit the reaction chamber.

Therefore, it is an object of this invention to provide a method utilizing a feed system to flow particulate solid materials at essentially their bulk density with a small amount of carrier gas without plugging to a flow splitter to feed a multiplicity of injector elements by providing a quick opening valve immediately downstream of a feeder bin and by providing a pressure differential between the feed bin and the feed line to the flow splitter.

Thus, it is an advantage over the prior art to provide a dense-phase particulate solid feeder and coal splitter system that will not plug by providing a quick opening valve immediately adjacent to the feed bin.

Yet another advantage over the prior art is the ability to flow solid particulate material in feed lines oriented in any direction, not just in a vertical direction as taught by the prior art.

Although this invention has been applied to pulverized coal, it will also operate successfully with a variety of other pulverized or granular materials.

The above-noted objects and advantages of the present invention will be more fully understood upon a study of the following detailed description in conjunction with the detailed drawings.

DESCRIPTION OF THE PREFERRED EMBODIMENTS

Figure 1:
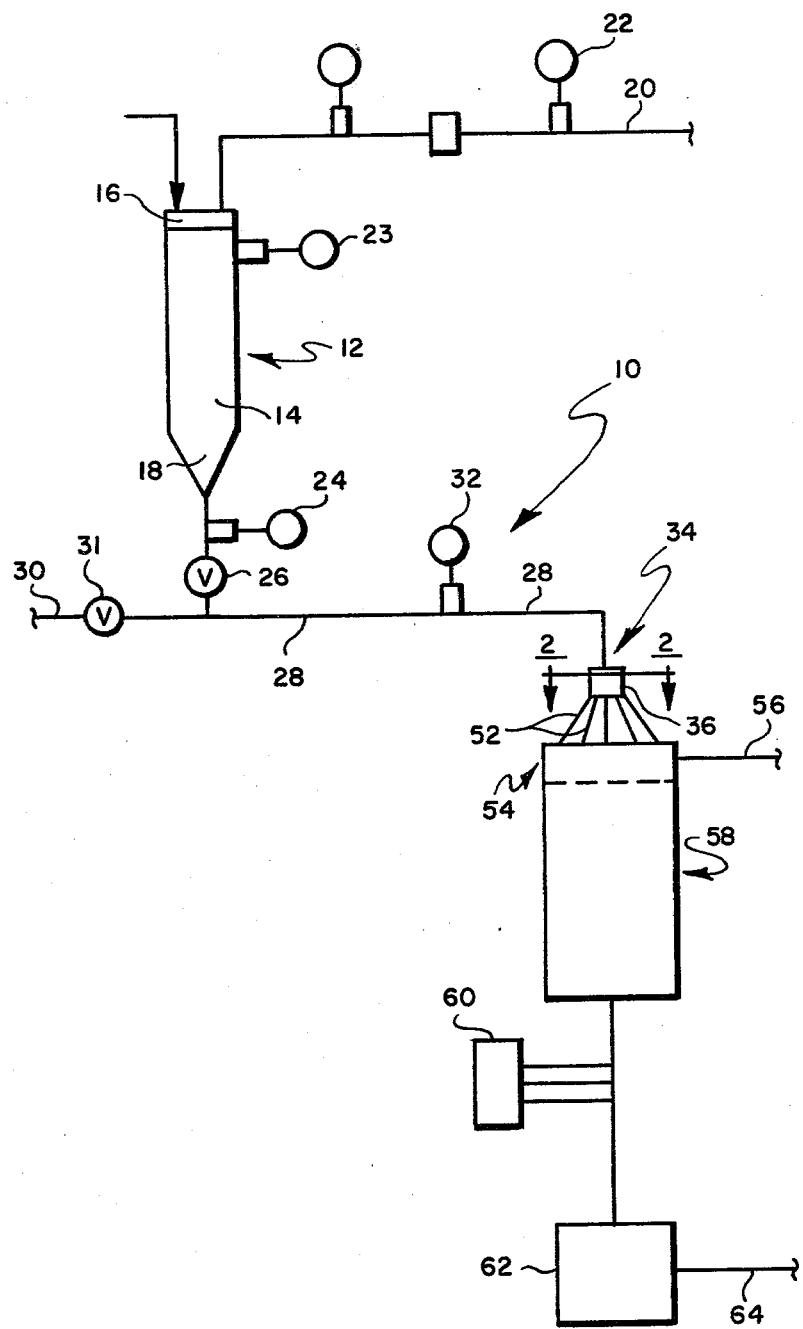
FIG. 1 is a schematic diagram of the dense-phase particulate solids feeder and flow splitter combination as it relates to a coal hydrogenation process.

Turning to the schematic of FIG. 1, the dense-phase particulate solids feeder and flow splitter combination generally designated as 10 consists of a coal feed hopper 12, housing 14, sealable lid 16 at the uppermost portion of hopper 12, and a conical bottom section 18 is formed with the sides thereof forming an angle of about 60° with the horizontal to direct, for example, fine particles of coal towards the bottom of the feeder. A ball valve 26, for example, is placed immediately adjacent to the end of the truncated conical section 18 of the housing 14. Connected to coal feed hopper 12 is a gas pressurizing line 20 where, for example, $GN_2$, $H_2$ or other gasses may be directed into the interior of the coal feed hopper 12 after it is filled to provide a pressure differential between the interior of the coal feed hopper 12 and the downstream line 28 in communication with valve 26. Valve 26 is normally closed during filling of the feed hopper 12. When the hopper is filled, lid 16 is then secured at the top of the hopper sealing the feeder vessel and the pressurizing gas is subsequently fed into line 20 to the interior of the vessel. The coal is found to readily flow from the hopper 12 when the gas pressure in the hopper 12 is greater than about 7 psig. However, only the gas in the interstices of the coal at its bulk density is carried with the coal. As the gas leaves the hopper 12, the pressure differential causes the gas to expand and to force the coal particles apart. Thus, very little gas is required to cause the flow. Where nitrogen is used as the carrier gas, the average ratio of volumetric flow rates corresponds to transporting 1.2 cubic feet of coal per cubic foot of carrier gas. Using coal particles of about 50 micron particle size, the flow density is 650 lbs. coal per lb. carrier gas at near atmospheric pressure. Using coal particles of about 200 micron particle size, the flow density is 960 lb. coal per lb. carrier gas. Moreover, this density is transported at flow rates ranging from about 0.1 lb/sec to 10 lb/sec. The amount of gas needed to transport the coal may be determined from Equation (1).

$$\frac{\dot{m}_s}{\dot{m}_g} \cdot \frac{\rho_g}{\rho_s} = \frac{\dot{v}_s}{\dot{v}_g} = \frac{(1-\epsilon)U_s}{\epsilon U_g} \tag{1}$$

where:
$\dot{m}_s$ = mass flow rate of solids
$\dot{m}_g$ = mass flow rate of gas
$\rho_g$ = density of gas $\rho_s$ = density of solids
$\dot{v}_s$ = volumetric flow rate of solids
$\dot{v}_g$ = volumetric flow rate of gas
$\epsilon$ = void fraction
$U_s$ = velocity of solids
$U_g$ = velocity of gas It is unlikely that the solids velocity can exceed the carrier gas velocity. Therefore, the maximum ratio of volumetric flow rates should correspond to $U_s/U_g = 1.0$. Also, the void fraction under static conditions may be calculated from the bulk density using Equation (2).

$$\rho_B = \rho_s(1-\epsilon_B) + \rho_g \epsilon_B \approx \rho_s(1-\epsilon_B) \qquad (2)$$

Thus, if the coal exits from the hopper 12 at its bulk density without additional gas, $$\frac{\dot{v}_s}{\dot{v}_g} \leq \frac{\left(\frac{\rho_B}{\rho_s}\right)}{1 - \frac{\rho_B}{\rho_s}} \qquad (3)$$

This result is highly significant since it indicates that the carrier gas requirement is very low. In fact, the flow has been found to be substantially more dense than any reported in the prior art and no additional gas is added during transport. In contrast, U.S. Pat. No. 3,963,598, issued June 15, 1976 to Bernard Manowitz et al, requires introduction of additional gas at the base of the hopper and, again, downstream. Such additional gas requires that all of the equipment downstream thereof must be sized to accommodate this additional gas. Thus, the dense-phase feed system employed in the practice of the present invention permits a substantial reduction in the cost of the entire plant. It should also be noted that Equations (1), (2) and (3) are applicable to any type of solids. Thus, the dense-phase feed system employed in the practice of the present invention may be employed to transport substantially any type of solids.

Figure 4:
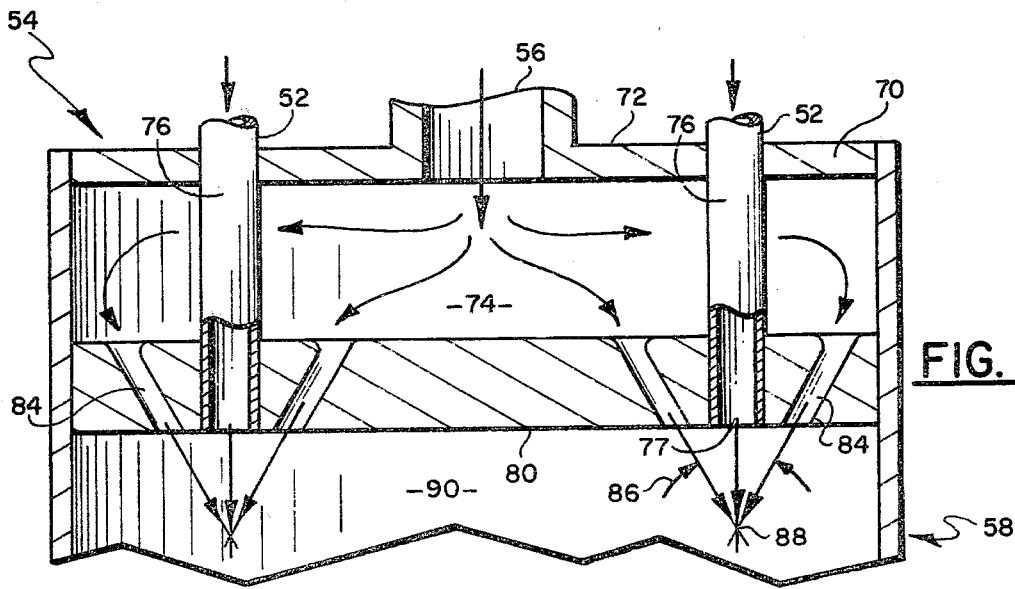
FIG. 4 is a cross-section of a typical coal hydrogenation injector assembly that is attached to the separate coal feed lines from the splitter apparatus.

A series of gauges 22, 23, 24 and 32 may be used to monitor the pressures in the various parts of the dense-phase particulate feeder combination 10. A feed line 28 is connected between the downstream side of ball valve 26 and the top of the coal splitter apparatus generally designated as 34. The splitter device evenly divides fine particulate solids into each of feed lines 52 extending from the bottom of the coal splitter 34. Each of the diverging coal splitter tubes lead into an injector device generally designated as 54 to provide an equal amount of dense-phase coal to the base of the injector (FIG. 4). A source of hot hydrogen is fed into line 56 to the interior of the injector 54, and the hot hydrogen and injected coal particles are subsequently intermingled within the interior of the reaction chamber generally designated as 58. The hydrogenated products exit the reaction chamber at the base of the chamber (not shown), and are quenched by quench source 60 to arrest the hydrogenation process at a predetermined short residence time period, and the resultant product is deposited within collection tank 62 downstream of quench source 60. Line 64 from the collection tank 62 taps off the reaction products to, for example, cyclone separators, condensers, gas samplers, etc., none of which is shown.

In operation, the coal feed hopper 12 is filled with finely divided coal particles such as, for example, 70% minus 200 mesh. After the hopper is filled (ball valve 26 being in the closed position), the top of the hopper 16 is sealed and a gas such as $GN_2$ is admitted through line 20 to the interior of the coal hopper to a predetermined pressure. Tests have been performed with a hopper pressure as low as 7 psi, but typically 20 to 100 psi, and a downstream pressure of ambient in line 28 below valve 26. The pressure differential between the interior of the hopper 12 and the interior of the line 28 emanating from the downstream end of valve 26 provides the driving force for the particulate coal particles when ball valve 26 is open. After the pressure differential is established, as determined by monitoring gauge 23, valve 26 is opened to admit coal to the downstream line 28. The coal flows rapidly (for example, 2000 lb/hr through a ⅜ inch line) towards the coal splitter 34, the splitter 34 then divides the constant flowing coal particles evenly between the respective channels 40 in the coal splitter housing 36 (FIGS. 2 and 3) towards the injector 54 via feed lines 52 emanating from the base 41 of the splitter housing 36. At the same time, hot hydrogen is admitted to the interior of the injector 54 through line 56, the hot hydrogen then passes through orifice 84 to impinge with the coal particles injected below the injector face 80 (FIG. 4) to react within the interior of reaction chamber 58. The reaction products are subsequently quenched by quench source 60 and are collected within collection tank 62.

Upon shutdown of ball valve 26, a purge line 30 is activated wherein, for example, $GN_2$ is admitted below valve 26 to clear line 28 from any residual coal particles that might be remaining. The inert gas simply cleans the passages in line 28, coal splitter 34, injector 54, and into the interior of the reaction chamber 58 in preparation for subsequent operation of the hydrogenation process. An on-off valve 31 is provided within line 30 to readily accommodate this line purge process.

Figure 2:
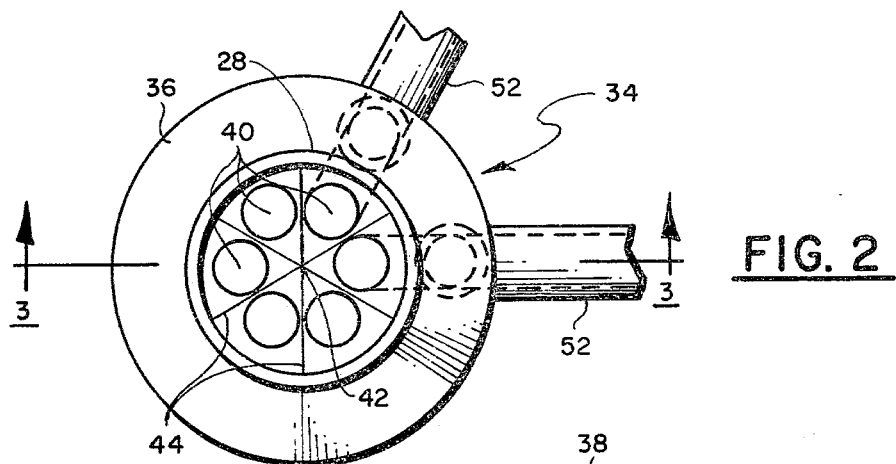
FIG. 2 is a section taken along lines 2—2 of FIG. 1 of the coal splitter apparatus.
Figure 3:
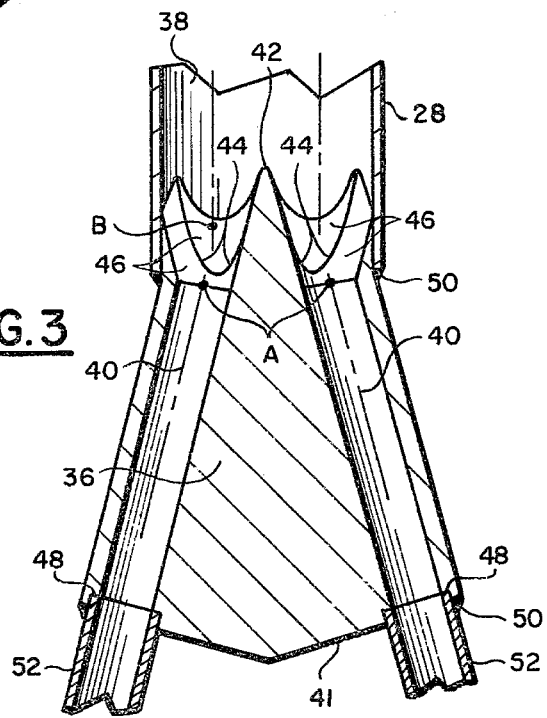
FIG. 3 is a section taken along lines 3—3 of FIG. 2 illustrating the coal splitter apparatus.

Turning now to FIGS. 2 and 3, a detail drawing of the coal splitter apparatus is shown wherein the coal splitter generally designated as 34 consists of a housing 36 and which is connected or otherwise metallurgically bonded, as by a weld 50, to the end of coal feed line 28. Within the end of the coal feed line 28 is defined a chamber or manifold 38. Coal splitter housing 36 is formed in a general conical shape. Each of the multiplicity of channels 40 are drilled through the housing 36 from the base side 41 in such a manner that each of the channels intersect the centerline of the attached feed line 28. Machined into the top of the housing 36 are a multiplicity of conical shaped countersinks (B) which intersect the centerline of individual channels 40 at points (A). The equally-spaced countersinks (B) machined into the top of housing 36 form a natural trough or channel defined by ridge lines 44 and surface 46 to provide a means to direct the coal particles evenly between each of the channels 40 in conical housing 36. When viewing FIG. 3 it can readily be seen that surface 46 is formed by conical countersinks (B) machined into the top of the conical housing 36. Ridge lines 44 formed by the intersection of adjacent countersinks (B) thus provide natural separating ridges to distribute the consistently flowing dense-phase coal particles evenly between all of the channels 40 in housing 36; thus the coal splitter 34 provides an even amount of coal at a constant rate towards the downstream multiple passage injector. The apex 42 is naturally formed by the simultaneous intersection of the equidistantly-spaced countersinks (B) at the centerline of housing 36. When the last countersink is machined the apex 42 is formed, thus the coal, as it enters the coal splitter, strikes the apex and is divided equally between the individual channels 40. It can be seen that the entire top surface of housing 36 is formed by the machining of countersinks (B), leaving no blunt edges that might cause coal clogging.

Turning now to FIG. 4, each of the coal feed lines 52 emanating from base 41 of housing 36 lead towards an injector housing generally designated as 54. Lines 52 at their uppermost ends are metallurgically bonded by a weld 50 within socket 48 in the base 41 of housing 36. The feed lines 52 are then bonded to short coal feed tubes 76 in injector housing 54 that traverse through upper surface 72 of injector body 70 into the injector face 80. A chamber 74 is formed by the injector body 70. Hot hydrogen feed line 56 communicates with chamber 74 to provide a source of hot hydrogen for the solid particulate coal. A series of orifices 84 are provided through the injector face 80 at an impingement angle so that each coal feed tube 76 is provided a source of hot hydrogen. These hole patterns for hot hydrogen may be two-on-one, or three-on-one, or four-on-one dependent upon the mixture ratio desired within the reaction chamber generally designated as 58. A two-on-one pattern is shown, for example, in the cross-section of FIG. 4.

An example of the value of dividing solids flow to multiple injection process has been demonstrated in a coal combustion experiment. In this application a six-element injection pattern was required to provide a very uniform mixing distribution in a combustion chamber. A six-element splitter was used to provide equal flowrate to each of the injection elements and the gaseous reactant in this case was pressurized air. Another related application planned for this feeding and dividing technique is for injection of "seed" materials (potassium or cesium compounds in powder form) into combustion chambers for magneto hydrodynamic generators. Again, the reason is to provide uniform distribution of the materials by injecting equal amounts at numerous locations.

During operation, as the coal is directed through coal feed lines 52 into the short tubes 76 within body 70, the hot hydrogen is generally simultaneously initiated, thus directing hot hydrogen through orifices 84 into the reaction manifold 90 defined by the reaction chamber walls 58. The angle 86 determines the point of impingement 88 of the hot hydrogen with the exiting coal particles from the end 77 of the coal feed tube 76. Impingement, for example, may occur approximately one-half inch below the face of the injector.

Obviously, other types of injectors may be shown. For example, each of the coal feed tubes 76 could be surrounded by concentric opening in the injector face 80 whereby the hot hydrogen simply passes by the outer walls of the tubes 76 and intermingles with the coal particles downstream of the injector face 80.

It is additionally obvious that other configurations of injectors may be utilized whereby it is necessary to provide a multiplicity of dense-phase sources of coal toward an injector.

It will, of course, be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

We claim:

1. The method of transporting particulate solids in dense-phase flow comprising the steps of:
   filling a feeder vessel with particulate solids;
   sealing said feeder vessel;
   delivering carrier gas into said sealed feeder vessel through a pressure inlet line in an amount to provide an initial pressure in excess of that in a downstream feeder line;
   opening a valve connecting a lower portion of the feeder vessel to said downstream feeder line so as to discharge said solids at their bulk density by the pressure differential and resultant expansion of the gas in the interstices of said particulate solids; and
   delivering additional carrier gas only through said pressure inlet line to said vessel and in an amount both to maintain a pressure differential between said vessel and said feeder line and to cause the solids to flow from said vessel through said valve and feeder line at their bulk density.

2. The method of claim 1 wherein said particulate solids have a mass-median size of from about 50 to 200 microns.

3. The method of claim 1 wherein the pressure differential between said feeder vessel and said downstream feeder line is maintained in the range of from about 5 to about 100 psig.

4. The method of claim 1 wherein the flow density of said solids and gas discharged from said vessel is up to about 1000 lb. solids per lb. gas.

5. The method of claim 1 wherein said solids and carrier gas are discharged from said vessel at a flow rate in the range of 0.1 lb. solids per second to 10 lb. solids per second.

6. The method of claim 2 wherein said particulate solids are pulverized coal.

7. The method of claim 6 wherein the pressure differential between said feeder vessel and said downstream feeder line is maintained in the range of from about 5 to about 100 psig.

* * * * *